United States Patent Office 3,210,328
Patented Oct. 5, 1965

3,210,328
EPOXIDIZED HYDROCARBON DRYING OILS
Harry J. Kiefer, Jr., Cleveland, Ohio, assignor to The Glidden Company, Cleveland, Ohio, a corporation of Ohio
No Drawing. Filed Dec. 1, 1960, Ser. No. 72,871
5 Claims. (Cl. 260—85.1)

This invention relates to novel epoxidized hydrocarbon drying oils, particularly to oils of the sodium-polymerized types, and the present application is a continuation-in-part of application Serial No. 515,208, filed June 13, 1955, now abandoned.

The hydrocarbon drying oils heretofore available have had numerous shortcomings which have interfered with their extensive use in coating compositions. Many of the oils have dried only slowly, or have dried superificially to give a non-sticky surface with the center in a tacky, undried state. Many oils which could be dried either in air or by baking exhibited films having poor flexibility, poor adhesion or poor chemical resistance. The more recent hydrocarbon drying oils which contain $C_4$–$C_6$ conjugated diolefins and which have been polymerized in the presence of sodium as a catalyst have found considerable use as film-forming material in coating compositions, but it has been difficult to cure them satisfactorily. In thin films, the sodium polymerized diolefin oils can be air-dried or baked to give durable, protective films of considerable merit, but even these have been difficult to cure in slightly thick films, such as occur at the fat edge of a coated metal sheet where the coating has accumulated. Attempts to cure such fat edges have included the use of various catalysts such as metallic driers and peroxides, but with only moderate improvement.

Another shortcoming common to most hydrocarbon drying oils of the past has been the lack of their compatibility with other film-forming materials or with many of the common oxygenated solvents.

According to the present invention, the curing rate and compatibility of hydrocarbon drying oils containing $C_4$–$C_6$ conjugated diolefins is improved by epoxidizing the oils without introducing oxirane-wasting hydroxyl (and ester) groups; i.e. by securing a modified oil in which the ratio of hydroxyl groups to oxirane groups is less than 1:1 and preferably less than 1:2. The resulting modified oil is hereafter referred to as epoxidized hydrocarbon drying oil. Another benefit which results from epoxidizing these oils resides in their improved functionality and reactivity both of which lead to oxygen linkages (i.e. ester and/or ether linkages). Such linkages can be used effectively to improve the through-cure and the curing rate, as shown hereinafter.

The primary object of this invention is to prepare and provide epoxidized alkali-metal-polymerized and peroxide-polymerized hydrocarbon drying oil containing $C_4$–$C_6$ conjugated diolefins in major amount, and containing by preference at least 1% of oxirane oxygen, by weight, or more preferably 3–8%.

A further object is to prepare and provide epoxidized sodium-polymerized hydrocarbon drying oils of such types, especially the copolymer types prepared from minor amounts of vinyl aromatics and major amounts of conjugated diolefins having 4–6 carbons.

These and ancillary objects will be apparent from the following description of my invention.

I have discovered that epoxidation of hydrocarbon drying oils of the types identified above improves the compatibility of the later with oxygenated solvents and with other film-forming materials, improves the adhesion, pigment-wetting and gloss properties of the oil and improves the curing in thick films and the drying properties thereof as compared with the starting oil. I have also found that the epoxy groups provide active centers for cross-linking and other reactions, and for preparing various derivatives having improved properties over the original hydrocarbon oils. Moreover, the epoxy groups make it possible to cure the oils through mechanisms not applicable to the original oils.

It should be understood that the principles of my invention can be applied to any of the hydrocarbon drying oils presently known. Nevertheless, since the alkali metal polymerized diolefin-containing oils, such as polybutadiene and butadiene (60–90%)-styrene (40–10%) copolymer oils of U.S. Patents 2,762,851 and 2,652,342 have so far come closest to being competitively useful in coating compositions, I prefer to epoxidize such oils, and I especially prefer to epoxidize the sodium-polymerized diolefin-vinyl aromatic copolymer oils mentioned above. Typical sodium-polymerized oils of my preferences are disclosed in U.S. application Serial No. 176,771, filed July 29, 1950, now U.S. Patent 2,762,851, and in U.S. Patents Nos. 2,652,342, 2,672,425, and 2,683,162, here incorporated by reference. As pointed out in U.S. Patent 2,762,851 the Gleason sodium-polymerized polymer oils are distinctive in having substantial quantities of side vinyl groups in their chemical structure.

In general, the synthetic oils to which the present invention is applicable are polymers of butadiene (preferred), isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with minor amounts of ethylenically unsaturated monomers copolymerizable therewith, e.g., with 0 to 40% of styrene, styrenes having 1–2 carbon alkyl groups substituted on the ring (such as para methyl styrene, dimethyl styrene or diethyl styrene), acrylonitrile, methacrylonitrile, methyl methacrylate, vinyl isobutyl ether, methyl vinyl ketone, and isopropenyl methyl ketone. While such synthetic oils can be prepared by mass polymerization in the presence of a hydrocarbon soluble peroxide catalyst, such as benzoyl peroxide or cumene hydroperoxide, I prefer to use metallic sodium with the monomers consisting of a 4–6 carbon diolefin or of a mixture of such a diolefin with a vinyl aromatic monomer of the kind(s) named above. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts t-butyl hydroperoxide (60% pure) and 0.75 part of diisopropyl xanthogen disulfide are heated in a closed reactor of about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

A preferred alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers, such as dioxane. Finally, additional hydrocarbon solvent is preferably distilled off until a product containing about 50%–100% non-voltatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e.g., butane, benzene, xylene, naptha, cyclohexane and the like. The diluents are usually used in amounts ranging from 50 to 500 parts per 100 parts of monomer. The reaction temperature may vary between about 40° C. and 100° C. preferably around 65 to 85° C. As a catalyst, 0.1 to 10 parts of dispersed metallic sodium is used per 100 parts of monomers, sodium particle sizes below 100 microns being particularly effective. Other alkali metals can be used similarly in place of sodium.

The polymers produced by the above process have molecular weights up to 10,000 and viscosities up to 22 poises at 50% NVM and are pale yellow to colorless oily liquids having intrinsic viscosities between about 0.15 and 0.6.

The oils can be epoxidized effectively by methods known to the art, such as those described in Bulletin No. 16 of the Buffalo Electrochemical Company and in U.S. Patent No. 2,569,502, or other known methods wherein preformed aliphatic per acids are used. I especially prefer, however, to use processes wherein performic and/or peracetic acids are formed in situ, such as the process described in the copending application of Radlove and Davis, Serial No. 515,783, filed June 15, 1955 now abandoned, and equivalent methods exemplified hereinafter. According to the method described in said copending application, a hydrocarbon drying oil is gradually contacted with hydrogen peroxide at temperatures maintained between about 20° C. and 50° C. in the presence of formic acid and a catalytic amount (e.g., 0.25–2.5% by weight on the oil) of oxygen-containing mineral acid (e.g., sulfuric or phosphoric). A diluent-modifier (e.g., acetic acid or mixtures of acetic acid and water) is desirably present also in an amount between about 10% and 55% by weight on the hydrocarbon oil. In accordance with the principles of the method, performic acid is formed in-situ by reason of the presence of the mineral acid. The process gives good yields of oxirane oxygen with concomitantly low percentages of hydroxyl groups, and the treatment can be continued with gradual addition of hydrogen peroxide until a desired oxirane content approaching the theoretical maximum or any lesser content has been secured. The resulting epoxidized oil is then recovered, washed, dried, etc. It should be understood that the theoretical maximum oxirane content should be computed by taking into account the selective action of the epoxidation, as will be explained hereinafter.

In any case the epoxidation reaction should be carried out under conditions favoring the protection and retention of the oxirane groupings which are formed so as to minimize their conversion to hydroxyl and/or ester groups. For example, in the case of the preformed and/or in-situ peracid reactions the treatment should be carried out at moderate temperatures, e.g. below about 90° C. and for only a few hours until all the major exotherm has been reached. Then longer times and higher temperatures up to 95° C. can be used to secure efficient consumption of the peracid or its precursor peroxide. That is, I seek to introduce oxirane oxygen groupings and seek to avoid conditions which open such groups to form hydroxyl and/or ester groups. Such groups are formed to a small extent even under best conditions, but their formation should be avoided as much as possible since they are formed at the expense of the desired oxirane groups.

Aliphatic peracids of 1–10 carbon atoms can be used for the epoxidations described herein, but cost, availability and practicality presently dictate the use of performic and/or peracetic acid.

The alkali-metal-catalyzed hydrocarbon polymer oils respond selectively to the aliphatic peracid epoxidation in that the side vinyl (1,2 addition) groups have been shown by infrared studies to be almost wholly unattacked while the in-chain (1,4 addition) double bonds are or can be completely epoxidized. This selective epoxidation is highly beneficial since it permits oxirane oxygen groupings to be installed at sites which are customarily dormant in normal air-curing or bake-curing. My epoxidation of the Gleason and like oils therefore makes use of such normally-dormant unsaturation and converts such sites to highly-reactive oxirane groups. At the same time, the side-vinyl groups, being practically unaffected by the epoxidation, are retained as such and become the main sites of unsaturation remaining for use in film formation by carbon-carbon addition, air oxidation, etc. The epoxidized oils consequently can be cured through the side-vinyls alone (by air- or bake-curing in the presence of oxygen (e.g. air), with or without curing catalysts such as organic peroxides and/or metallic driers which assist and promote addition and/or oxidative curing through the side-vinyls), through the oxirane oxygen groupings alone (i.e. by using the known reactivity of such groups with dicarboxylic acids, diamines, mercaptans, dimercaptans, etc.) to form ester, ether and/or thiaether linkages, or through a combination of both types of curing mechanisms.

This upgrading of the curing potentialities of the Gleason and like oils consequently makes it possible now to secure through-drying of thick films or even of cast masses, while also expanding the number of curing mechanisms which can be applied in a given instance. This expansion is very helpful, since it enables one to tailor the end result by choosing mechanisms which tend to give, more effectively, the kind(s) of cross-linking needed to provide the film-qualities sought for particular exposures or end uses.

In the copending application of Millar and Radlove, Serial No. 517,096, filed June 21, 1955, now U.S. Patent 2,921,947, it is shown that the epoxidized oils can be esterified with carboxylic acids to produce modified oils having additionally improved properties in respect to compatibility with other materials and in respect to film qualities.

For the purposes of the present invention, the hydrocarbon drying oils can be epoxidized any desired amount up to the natural limit imposed by the available in-chain unsaturation of the starting oil, which in some instances permits oxirane oxygen contents of 10% or even higher. At least about .25% oxirane oxygen should be attained in order to secure a significant alteration. I prefer to attain an oxirane content between about 1% and 8% by weight and especially prefer about 3–8%.

I have found that my expoxidized oils give exceptionally good protective and insulating films when cured in contact with copper, as where coatings are applied to copper wire and other forms of electrical copper.

The following examples illustrate the principles of my invention and the preparation of my novel products. In these examples, oxirane oxygen content has been determined by the following procedure:

(1) Weigh 0.3 to 0.5 g. (± .0001 g.) of the sample into a 50 ml. Erlenmeyer flask. Dissolve the sample in 5 ml. chlorobenzene (analytical reagent grade). Add 5 drops of the crystal violet indicator [1] and a magnetic stirring bar.

(2) Place a rubber stopper (having a small vent opening therein) in the flask with a buret tip passing therethrough and lower the tip of a buret until it discharges just above the solution. This is important to avoid loss of HBr.

(3) Stir and titrate the sample (rapidly at first) with 0.1 N glacial acetic acid/HBr solution [2] to a bluish-green end point. Control the rate of the magnetic stirrer so as to avoid splashing.

(4) Calculation $$\text{Oxirane oxygen } (\%) = \frac{\text{titration} \times N \times 1.60}{\text{Weight of sample}}$$

where N equals "Normality."

(5) Reproducibility: The difference between duplicate determinations made by the same operator should not exceed 0.08.

(6) Reference: Durbetaki, A. J. Analytical Chemistry 28, pg. 2000 (1956); A.O.C.S. Tentative Method Cd 9–56.

Example 1

A solution was prepared from 500 parts of mineral spirits (a naphtha, boiling range 160° to 200° C.) and 500 parts of a synthetic, sodium-polymerized butadiene-styrene copolymer drying oil prepared in the manner of Synthesis B above. The oil had an Iodine Value of 318

[1] Indicator solution: dissolve 0.1 g. gentian violet (Eastman Kodak No. 1350 or equivalent) in 100 ml. of glacial acetic acid.
[2] Prepare by bubbling anhydrous HBr gas through glacial acetic acid (A.C.S. grade) to approximately 0.1 N. Standardize with dry sodium carbonate (e.g. about .1 g.) dissolved in ca. 5 ml. of glacial acetic acid, and titrate using 5 drops of crystal violet indicator solution. Standardize daily.

$$\text{"Normality"} = \frac{\text{Wt. of Na}_2\text{CO}_3}{.053 \times \text{titration in ml.}}$$

and an acetyl value of 2.4. To the foregoing solution of mineral spirits and hydrocarbon drying oil the following materials were added:

26.2 parts of glacial acetic acid
25.2 parts of 88% formic acid
7.1 parts of 50% aqueous sulfuric acid The mixture was placed in a water bath at 30° C. and 72.5 parts of 50% hydrogen peroxide was added. The temperature rose to 45° C. The mixture was cooled to below 40° C. and 72.5 more parts of 50% hydrogen peroxide was added. After three hours of reaction, the concentration of peroxide had decreased to 0.3% and the mass was agitated for one hour longer to insure complete reaction. The reaction mixture was then washed with saturated aqueous sodium chloride, containing about 10% ethyl alcohol, and then with dilute aqueous sodium carbonate, the washed product was centrifuged and freed from the last traces of moisture by filtering the centrifugate through anhydrous sodium sulfate and filter aid. The resultant almost colorless oil had a non-volatile content of 55.2%, an oxirane value of 3.3% on 100% solids basis, an acid value of .54, and an acetyl value of 7.2. The epoxidized product gave surface coatings on steel test panels which after baking at 325° F. for about 20 minutes were superior in hardness and adhesion to the untreated drying oil. Similar results were secured by similarly treating the peroxide polymerized oil of Synthesis A, above.

Example 2

A portion of the same hydrocarbon drying oil used in Example 1 was epoxidized in a corresponding manner to produce an oil having an oxirane content of 2.6%, an acetyl value of 4.3, an acid value of .32, and a solids content of 52%. The oil yielded a clear film when baked on steel panels for 10 minutes at 400° F. at a film thickness of about 2 mils.

The epoxidized oils of Examples 1 and 2 were blended with various other film-forming materials in a compatibility test, and compatible or hazy mixtures were baked on glass panels for 30 minutes at 300° F. to observe whether or not compatibility was secured in the cured films. The unepoxidized starting oil was carried through the tests as a control. The following table summarizes the results

TABLE I.—COMPATIBILITY

| Resin | Ratio | Control | | Example 1 | | Example 2 | |
|---|---|---|---|---|---|---|---|
| | | Solution | Film | Solution | Film | Solution | Film |
| Petroleum [1] | 1:1 | Clear | Hazy | Clear | Clear | Clear | Clear. |
| Epoxidized oil [2] | 1:1 | Hazy | Clear | Sl. haze | do | Sl. haze | Do. |
| Polyamide [3] | [4] 5% | Clear | do | Hazy | do | Hazy | Do. |

[1] Velsicol AD63.
[2] Rohm and Haas Paraplex G-62, an epoxidized soy bean oil containing about 6% oxirane oxygen, by weight.
[3] General Mills 115.
[4] By weight on epoxidized hydrocarbon oil.

Example 3

Polybutadiene drying oils prepared in the manner of Synthesis A and Synthesis B above were epoxidized by the method described in the Radlove and Davis application, supra, to oxirane oxygen values of about 2.9%. Films of the resulting oil were applied to steel panels and to copper in film thicknesses of about 2 mils. The applied films were then baked 30 minutes at 300° F. Good through-cure was obtained on the steel panels but greater hardness was observed in the films applied to copper.

Example 4

A polybutadiene drying oil having a molecular weight of approximately 1500 was prepared by the metallic sodium polymerization technique of Method B above. A solution of 21.6 grams of this polymer in 200 ml. of chloroform was prepared. This solution was mixed with 1800 ml. of a chloroform solution of 40% peracetic acid containing 64 g. of the 40% acid, a 10% excess above the stoichiometric requirements. The resulting mixture was left on ice for 24 hours to permit reaction. Then the reaction mass was washed with aqueous potassium hydroxide and sodium carbonate and 4 to 5 gallons of water until it became neutral. Solvent was removed at 35°–40° C. under vacuum to permit recovery of a nearly solvent-free storage-stable viscous but pourable liquid having an oxirane oxygen content of 8.32%.

*Example 5*

A copolymer of 70 parts of butadiene and 30 parts of styrene, having a molecular weight of approximately 1700 was prepared by the metallic sodium polymerization technique of Method B, supra. A solution of 30 g. of this copolymer in 300 ml. of chloroform was prepared. This solution was mixed with a solution of 71.5 g. of 40% peracetic acid in 2250 ml. of chloroform, this amount of peracetic acid being a 10% excess above stoichometric requirements. The resulting mixture was left on ice for 24 hours to permit reaction. Then the reaction mass was washed and vacuum stripped in the manner described in Example 4. The resulting residue was a storage-stable pourable, clear, viscous liquid having an oxirane oxygen content of 7.60% by weight.

*Example 6*

A commercial "C-oil" product (Esso) prepared from about 80% butadiene and 20% styrene by the sodium polymerization technique of Method B, supra, and having an iodine number of about 320, was epoxidized by dissolving 5.86 lbs. of the copolymer in 2.51 lbs. of xylol in a glass flask equipped for distillation for admission of inert gas and for effective water-cooling, when needed. Formic acid (90% conc'n.), in an amount of 0.455 lb. was added to the flask and an inert gas atmosphere was formed and thereafter maintained in the flask. The flask and contents were then heated to 104° F. and held for 30 minutes without further heating. Then addition of 50% hydrogen peroxide, in a total weight of 2.55 lbs. was commenced by adding it slowly during the first 15–20 minutes. The reaction had commenced by this time and became very exothermic. Cooling was applied when necessary to prevent the temperature from rising over 160° F. After the induction period had been passed, the hydrogen peroxide was added at such a rate that the temperature of the mass was held between 125° and 160° F. After all the peroxide had been so added, the reaction mass was held at 160° F. for about two hours (until no further exotherm was noted) and then vacuum distillation was commenced, the temperature of 160° F. being maintained throughout, and the vacuum being 12–15 inches near the end. The vacuum distillation removed the solvent and most of the water. The vacuum was then reduced to 10 inches and water in an amount of 0.10 lb. was drawn in and mixed with the contents of the flask for 15 minutes. The vacuum was then raised and the water was vacuum stripped to leave a practically water-free product. Distillation was then discontinued and 2 lbs. of xylol was added as solvent, and was thoroughly mixed in. The resulting solution was filtered. It had a non-volatile content of 62.2% and an oxirane oxygen content (based on the non-volatile solids) of about 6.1% by weight. This xylol solution of the epoxidized C-oil was storage-stable an was used in the following test compositions, being identified in the tabulation as "Epoxy."

The test compositions shown below were prepared separately in accordance with the indicated formulations, then were coated on cold rolled steel in film thicknesses (dry) of about 2 mils. Various curing conditions were then applied, all as indicated in the table.

| Composition | Epoxy | Epoxy+Co drier (1,000 p.p.m.) | Epoxy+Co drier (500 p.p.m.) | Epoxy+Mn drier (100 p.p.m.) | Epoxy+Mn drier (50 p.p.m.) | Epoxy+anhydride (0.3 lb. anhydride/lb.) | Epoxy+anhydride (0.6 lb. anhydride/lb.) | Epoxy+anhydride (1.0 lb. anhydride/lb.) | Epoxy+anhydride+Co drier (1000 p.p.m.; anhydride=0.3 lb. per lb.) |
|---|---|---|---|---|---|---|---|---|---|
| | 1 | 2 | 3 | 4 | 5 | 6 | 7 | 8 | 9 |
| Epoxy supra | 50 | 50 | 50 | 50 | 50 | 50 | 50 | 50 | 50 |
| Xylene | 12.2 | 11.2 | 11.2 | 12 | 12.1 | 75 5 | 2.8 | | 6.5 |
| Co octoate, 3.0% Co | | 1 | 0.5 | | | | | | 1 |
| Mn naphthenate, 1.6% Mn | | | | 0:195 | 0.1 | | | | |
| Chlorendic anhydride* (MEK/xylene 1:1) (40% solution) | | | | | | 23.3 | 46.6 | 77.8 | 23.3 |
| Con'n. metal of drier, p.p.m. | | 1,000 | 500 | 100 | 50 | | | | |
| Con'n. anhydride lb. anhyd./lb. resin solids | | | | | | 0.3 | 0.6 | 1.0 | 0.3 |

CONDITION OF FILM

| Curing treatment: | | | | | | | | | |
|---|---|---|---|---|---|---|---|---|---|
| Air dry overnight, ambient temp. approx. 70° F. | t'ky | t'ky | t'ky | t'ky | t'ky | 4–5 hrs., tack free. | 3–4 hrs., tack free. | 3–4 hrs., tack free. | tack free. |
| Bake 15 min/300° F., Film hot. | very t'ky. | very t'ky | very t'ky | t'ky | t'ky | sl. t'ky | OK | OK | OK. |
| Bake 15 min/300° F., Film room temp. | t'ky | t'ky less than 1. | t'ky less than 1. | very faint residual tack. | residual tack. | OK | OK | OK | OK. |
| Bake 30 min./300° F., Film room temp. | Sl. t'ky | OK | OK | OK | OK | | | | |
| Bake 30 min/350° F. | OK | | | | | | | | |

\* Hexachloro endomethylene tetrahydrophthalic anhydride, sometimes called HET anhydride; 1,4,5,6,7,7-hexachloro bicyclo 2.2.1-5-heptene-2,3-dicarboxylic anhydride.

Observations:
(a) In the absence of curing aids epoxidized C-oil will cure to form a satisfactory film by baking ½ hr. at 350° F. This cure is assumed to take place through residual unsaturation.
(b) In the presence of suitable driers (e.g. manganese, cobalt, etc.) the curing temperature can be reduced and satisfatcory films are produced by baking ½ hr. at 300° F. This cure is assumed to take place by means of residual unsaturation.
(c) In the presence of acid anhydrides the curing conditions can be reduced in potency and satisfactory films are produced by curing at room temperature. This cure takes place by reaction of anhydride and epoxy groups.
(d) Both curing mechanisms can occur simultaneously as evidenced by the reduction in hot-tack for sample (9), (anhydride plus drier) vs. sample (6), (anhydride only). This dual curing mechanism is further illustrated by the example which follows.

Example 7

Two coating formulations detailed below are here compared to illustrate curing of a film by cross-linking through oxirane oxygen groupings, versus a dual-mechanism cure employing the same cross-linking agent plus metal drier and anti-oxidant.

"Blocking" (referred to below) is the term used to identify the situation where (a) a plurality of coated articles (whose coatings appear to be fully cured) are stacked one upon the other so that their coated faces are in contact and (b) where the stacked articles are found to stick together after some arbitrary fixed time under test conditions of temperature and pressure.

The two formulations compared below illustrate that the blocking which occurs with one of the formulations can be overcome by adding manganese drier and anti-oxidant, thereby to secure a dual mechanism cure.

FORMULATION 7A

| Component I [1]: | Wt. percent |
|---|---|
| Acidic vinyl chloride tetrapolymer [2] | 19.8 |
| Dimethyl formamide | 5.0 |
| MEK (methyl ethyl ketone) | 5.0 |
| Xylene | 22.95 |
| Propylene oxide | 0.05 |
| Component II: | |
| "Epoxy" (epoxidized C-oil solution of Example 6) | 22.0 |
| Xylene | 25.2 |
| Total | 100.0 |

FORMULATION 7B

| Component I: | Wt. percent |
|---|---|
| Acidic vinyl chloride tetrapolymer [2] | 19.20 |
| Dimethyl formamide | 5.00 |
| MEK (methyl ethyl ketone) | 5.00 |
| Xylene | 23.425 |
| Propylene oxide | 0.10 |
| Manganese octoate (6% in xylene) | 0.025 |
| Anti-oxidant (N-pelargonyl p-amino phenol) | 0.050 |
| Component II: | |
| "Epoxy" (epoxidized C-oil solution of Example 6) | 22.00 |
| Xylene | 25.20 |
| Total | 100.0 |

[1] Described and claimed as a can coating formulation in copending application Serial No. 858,819, filed November 30, 1959.
[2] The tetrapolymer is prepared from vinyl chloride 70%, di-n-butyl maleate/fumarate 6.7%; mono-n-butyl maleate 8.3% and, 2-ethyl hexyl acrylate 15% by copolymerization in the presence of trichloroethylene 1.7%. See Example 8 of S.N. 858,819, the disclosure of which is here incorporated by reference.

Component I of each formulation is mixed with Component II of the same formulation in equal parts by volume, to produce in each instance a storage-stable curbale composition of good shelf-life.

It will be noted that the resin ratios of both formulations are 60 parts vinyl tetrapolymer to 40 parts epoxidized C-oil. It will also be noted that the vinyl tetrapolymer of Formulations 7A and 7B contains residues of maleic half-esters (monomethyl maleate) and hence contains reactive free carboxyl groups which can react with the oxirane oxygen groups of the epoxidized C-oil to cross-link the resins. The following results were secured after metal panels had been coated with the formulations and cured as shown below, then stacked in a "blocking" test:

Baked ten minutes at 345° F.

7A—"Blocked" when coated faces held in contact for 15 minutes at 125° F. under 80 lbs. pressure.
7B—Does not "block" under test conditions stated for 7A.

Baked ten minutes at 375° F.

7A—Does not "block" under same test conditions.
7B—Not tested.

Example 8

This is an example of a pigmented air-curing coating for metal and other substrates employing the epoxidized C-oil of Example 6 in conjunction with a dicarboxylic acid curing agent.

The epoxidized oil coating is formulated as follows:

| | |
|---|---|
| Rutile titanium dioxide | lbs__ 1.5 |
| Lampblack, blue tone | lbs__ 0.03 |
| Epoxidized C-oil solution of Ex. 6 | pints__ 7.75 |
| Xylol | do__ 1.25 |

These materials are milled together to give a gray enamel having a viscosity of 75–85 seconds at 80° F. (No. 4 Ford Cup) and weighing 8.8 lbs. per gallon.

The curing agent for the above enamel is formulated as follows:

| | |
|---|---|
| Chlorendic anhydride | lbs__ 217 |
| Methyl ethyl ketone | gal__ 43.3 |
| Toluene | gal__ 43.6 |

Its non-volatile content is 26.3% and the agent weighs 8.25 lbs. per gallon. For spraying application, the enamel is mixed with the curing agent in a volume ratio of 2 to 1.

The resulting sprayed coating cures in 4 to 5 hours at room temperature and at that time is hard enough to permit handling. Curing continues, however, to develop greater hardness and exposure resistance.

Having described my invention, what I claim is:

1. The storage-stable product capable of film-formation through cross-linking mechanisms employing oxidation and oxirane reactivity, said product being an epoxidation reaction-product of (a) 1–10 carbon aliphatic peracids and (b) polymerized butadiene/styrene drying oil consisting essentially of 60–90% of combined butadiene monomer, balance combined styrene monomer, said monomers having been combined to form said oil by solution-polymerizing them in the presence of sodium, said drying oil being characterized by a molecular weight between about 1000 and 10,000, and by the presence in its molecules of a substantial number of side vinyl groups, said epoxidation product being characterized by containing between about 1% and 10% by weight or oxirane oxygen therein, by containing a ratio of hydroxyl groups to oxirane groups less than about 1:1, and by containing unsaturation which is reactive with oxygen of the air to cause film-formation, substantially all of said oxygen-reactive unsaturation corresponding to original side vinyl groups of said drying oil.

2. The stable product as claimed in claim 1 wherein said aliphatic peracids contain 1–2 carbon atoms.

3. The stable product as claimed in claim 2 wherein the sodium-polymerized drying oil consists essentially of about 80% butadiene and 20% styrene.

4. The stable product as claimed in claim 3 wherein the oxirane oxygen content is between about 3% and 8%, and wherein the ratio of hydroxyl groups to oxirane oxygen groups is less than 1:2.

5. The stable product as claimed in claim 1 wherein the oxirane oxygen content is between about 3% and 8%, and wherein the ratio of hydroxyl groups to oxirane oxygen groups is less than 1:2.

(References on following page)

References Cited by the Examiner

UNITED STATES PATENTS

| | | | |
|---|---|---|---|
| 2,660,563 | 11/53 | Banes et al. | 260—348 |
| 2,785,185 | 3/57 | Phillips et al. | 260—348.5 |
| 2,801,253 | 7/57 | Greenspan et al. | 260—348.5 |
| 2,833,747 | 5/58 | Greenspan et al. | 260—348 |
| 2,842,513 | 7/58 | Fitzgerald et al. | 260—348 |

OTHER REFERENCES

Kolthoff et al.: J. of Polymer Science, vol. 2, pgs. 206–228 (1947).

JOSEPH L. SCHOFER, *Primary Examiner.*

IRVING MARCUS, WILLIAM H. SHORT, LEON J. BERCOVITZ, *Examiners.*

UNITED STATES PATENT OFFICE
CERTIFICATE OF CORRECTION

Patent No. 3,210,328                          October 5, 1965

Harry J. Kiefer, Jr.

It is hereby certified that error appears in the above numbered patent requiring correction and that the said Letters Patent should read as corrected below.

Column 1, line 69, for "later" read -- latter --; columns 7 and 8, in the table, under the column heading "Epoxy-anhydride (0.3 lb. anhydride/lb.)", line 2 thereof, for "75 5" read -- 7.5 --; column 10, line 54, for "or" read -- of --.

Signed and sealed this 28th day of June 1966.

(SEAL)
Attest:

ERNEST W. SWIDER
Attesting Officer

EDWARD J. BRENNER
Commissioner of Patents